United States Patent
Park et al.

(10) Patent No.: US 8,879,738 B2
(45) Date of Patent: Nov. 4, 2014

(54) SYSTEM AND METHOD OF UPDATING KEY BASED ON COMMUNICATION COST AND SECURITY DAMAGE COST

(75) Inventors: Yongsuk Park, Seoul (KR); Seung-Woo Seo, Seoul (KR); Dong Hyun Je, Seoul (KR); Sung Woo Kim, Seoul (KR); Jun Sik Lee, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 1275 days.

(21) Appl. No.: 12/467,876

(22) Filed: May 18, 2009

(65) Prior Publication Data

US 2009/0323964 A1 Dec. 31, 2009

(30) Foreign Application Priority Data

Jun. 30, 2008 (KR) ........................ 10-2008-0063105

(51) Int. Cl.
*H04L 9/08* (2006.01)
(52) U.S. Cl.
CPC .................................. *H04L 9/0891* (2013.01)
USPC ......................................................... 380/278
(58) Field of Classification Search
USPC .................................................. 380/278, 277
See application file for complete search history.

(56) References Cited

U.S. PATENT DOCUMENTS 6,295,361 B1  9/2001  Kadansky et al.
7,296,159 B2 * 11/2007  Zhang et al. .................. 713/171

2005/0018853 A1  1/2005  Lain et al.
2006/0282666 A1  12/2006  Kim
2008/0170692 A1 *  7/2008  Eastham et al. .............. 380/277

FOREIGN PATENT DOCUMENTS

| JP | 2003-023418 | 1/2003 |
|---|---|---|
| JP | 2006-129432 | 5/2006 |
| KR | 10-2005-0089736 | 9/2005 |
| KR | 10-2008-0001377 | 1/2008 |
| KR | 10-2008-0028686 | 4/2008 |

OTHER PUBLICATIONS

Yang et al., Reliable Group Rekeying: A performance Analysis, ACM, 2001, Retrieved from the Internet <URL: portal.acm.org/citation.cfm?id=964723.383062>, pp. 1-12 as printed.*
Zhang et al., On Rekey Policies for Secure Group Applications, IEEE, 2003, Retrieved from the Internet <URL: ieeexplore.ieee.org/xpls/abs_all.jsp?arnumber=1284224&tag=1>, pp. 1-6 as printed.*
Cho et al.; Optimization of Batch Rekey Interval for Secure Group Communications in Wireless Network; 2005; Retrieved from the Internet <URL: ieeexplore.ieee.org/xpls/abs_all.jsp?arnumber=1549463>; pp. 1-6 as printed.*

* cited by examiner

*Primary Examiner* — Michael Chao
(74) *Attorney, Agent, or Firm* — NSIP Law

(57) ABSTRACT

A system and method of updating a key based on communication and security damage costs are provided. The key updating system for group communication between a plurality of group members, includes a key update cycle determining unit to determine a key update cycle based on a communication cost and a security damage cost, and a key updating unit to perform a key updating with respect to one or more group members of the group communication based on the determined key update cycle.

15 Claims, 8 Drawing Sheets

SYSTEM AND METHOD OF UPDATING KEY BASED ON COMMUNICATION COST AND SECURITY DAMAGE COST

CROSS-REFERENCE TO RELATED APPLICATION

This application claims the benefit under 35 U.S.C. §119 (a) of a Korean Patent Application No. 10-2008-0063105, filed on Jun. 30, 2008 in the Korean Intellectual Property Office, the entire disclosure of which is incorporated herein by reference.

BACKGROUND

1. Field

The following description relates to a system and method of updating a key based on communication and security damage costs, and more particularly, to a system and method of managing a key updating time based on a tradeoff between a communication cost and a security damage cost for a terminal.

2. Description of Related Art

Generally, multicast may be used as an effective method for simultaneously transmitting identical data to a number of users. Key updating for secure multicast services may be widely utilized in multimedia services, video conference, and the like. In this case, security characteristics should be such that each service is operated smoothly. Specifically, there are services requiring a strict security, while there are services not requiring the same. Also, there are services involving low cost at the time of updating keys due to abundance of communication resources, while there are services involving higher cost at the time of updating keys due to limitations in communication resources.

Accordingly, there is a need to determine a cycle for updating a key to minimize the cost based on service characteristics, and for a system and method that may effectively minimize the cost when updating the key.

SUMMARY

In one general aspect, there is provided a system and method of updating keys which manages a key updating time based on a tradeoff between a communication cost and a security damage cost.

In another general aspect, there is provided a key updating system for group communication between a plurality of group members, includes a key update cycle determining unit to determine a key update cycle based on a communication cost and a security damage cost, and a key updating unit to perform a key updating with respect to one or more group members of the group communication based on the determined key update cycle.

The key update cycle determining unit may comprise a communication cost calculating unit to calculate the communication cost based on cost per key update message and the number of key update messages, and a security damage cost calculating unit to calculate the security damage cost based on an exposed time during which the group communication is exposed to a group member having left from the group communication.

The communication cost calculating unit may calculate the communication cost based on a ratio of the group member having left from the group communication, the cost per key update message, and the number of key update messages.

An average number of the key update messages may be calculated based on an expectation value of a number of sub trees including group members having left from a tree structure in which group members in the same level have the same degree.

The security damage cost calculating unit may calculate the security damage cost based on a preceding key update time and a maximum exposed time of exposed times, and the exposed time is determined based on a time when the group member leaves from the group communication and a following key update time.

The security damage cost calculating unit may calculate the security damage cost based on a sum of a preceding key update time and the exposed time, and the exposed time is determined based on a time when the group member leaves from the group communication and a following key update time.

The key update cycle determining unit further may comprise a weight value giving unit to give a weight value to each of the communication cost and the security damage cost, and a key update cycle calculating unit to calculate the key update cycle based on an operation between the communication cost and security damage cost to which the respective weight values are given.

The key update cycle determining unit may comprise a leave message receiving unit to receive a leave message from a group member having left from the group communication, and a key update cycle calculating unit to calculate the communication cost and the security damage cost based on the number of received leave messages to thereby calculate the key update cycle.

The key updating system may further comprise a variation rate calculating unit to calculate a variation rate of a group member having left from the group communication based on a leave message received from the group member.

The key update cycle determining unit may calculate the communication cost and security damage cost based on the variation rate to thereby determine the key update cycle. The key updating unit may transmit, to the key update cycle determining unit, information about a time during which the key updating is performed, and the key update cycle determining unit may determine a preceding key update cycle according to the time during which the key updating is performed.

According to still another general aspect, a key updating method for use in group communication between a plurality of group members, includes determining a key update cycle based on a communication cost and a security damage cost, and performing a key updating with respect to one or more group members of the group communication based on the determined key update cycle.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION OF EMBODIMENTS

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1:
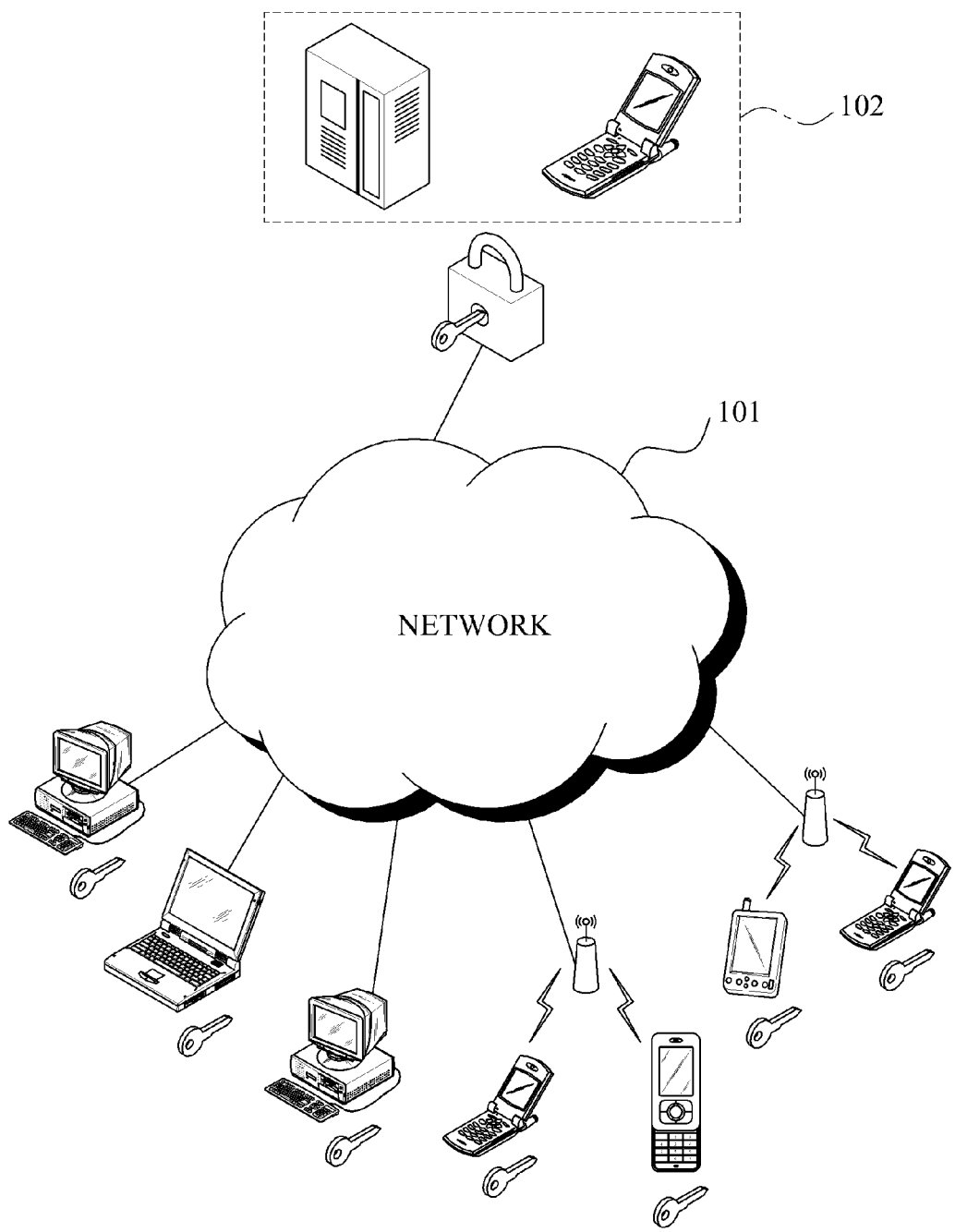
FIG. 1 is a diagram for illustrating an exemplary group communication between a plurality of group members.

FIG. 1 illustrates an example of group communication between a plurality of group members. An environment where group members communicate with each other using a network 101 is illustrated in FIG. 1. Here, the group members may be, for example, communication equipments such as a general computer, notebook, Personal Digital Assistant (PDA), mobile phone, and the like, enabling access to a network. The group members may have a group key for encrypting data in order to prevent communication data between the group members from being externally exposed. Where a new group member enters, the existing key may be required to be changed in order to prevent preceding data from being exposed to the new group member. Also, where the existing group member leaves from group communication, the key exposed to the group member having left may be required to be updated.

For example, the key updating may be performed in a Key Distribution Center (KDC), and the performed key updating may be transmitted to the group members through the network 101. In this case, an equipment for group communication may correspond to KDC for secure group communication and equipments acting as KDC enabled to manage keys. As an example, a general key server may be representative of the equipment for group communication. Also, an arbitrary mobile equipment may be a subject of group communication. As shown in FIG. 1, at least one of a general key server and at least one mobile equipment 102 may act as KDC to perform key updating.

According to an aspect, a key updating system may be included in a communication equipment acting as the KDC and perform the key updating. Also, throughout the specification, as the case(s) may be, the terms 'key updating' and 'batch key updating' may have the same meaning.

Figure 2:
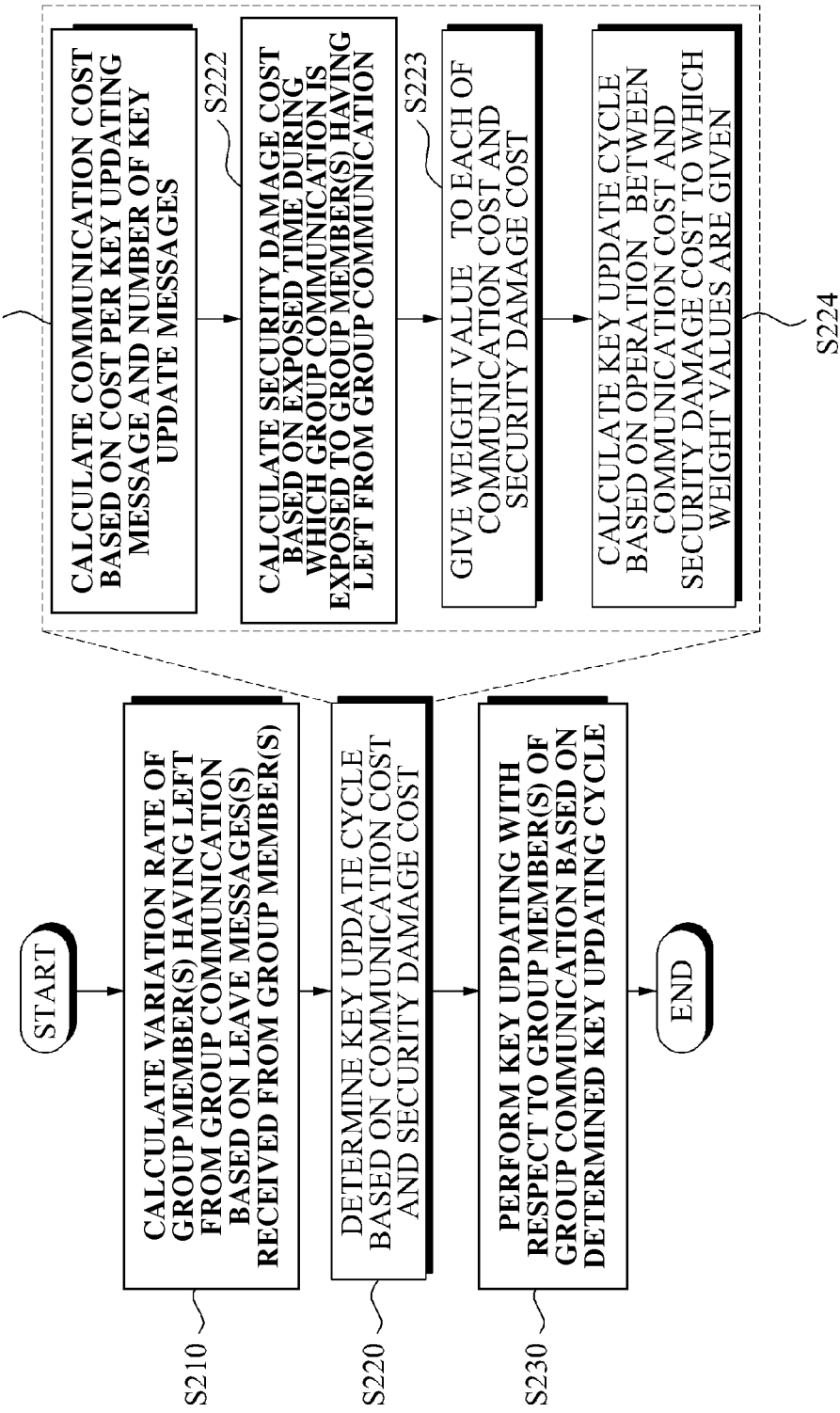
FIG. 2 is a flowchart illustrating a key updating method according to an exemplary embodiment.

FIG. 2 is a flowchart illustrating a key updating method according to an exemplary embodiment. According to an aspect, the key updating method may be performed by a key updating system illustrated in FIG. 1.

In operation S210, the key updating system calculates a variation rate of a group member, that is, the group member(s) having left from group communication, based on a leave message(s) received from the group member(s). Here, the variation rate of the group member having left from the group communication may be used to calculate the communication cost and the security damage cost, which will be explained below. A method for measuring the variation rate will be described with reference to FIG. 4.

In operation S220, the key updating system determines a key update cycle based on the communication cost and the security damage cost. The communication cost and security damage cost may vary depending on the key update cycle, and variations in the communication cost and security damage cost depending on the key update cycle will be described with reference to FIG. 3. In the operation S220, the key updating system may perform operations S221 to S224 as further shown in FIG. 2.

In operation S221, the key updating system may calculate the communication cost based on a cost per key update message and the number of key update messages. For example, the key updating system may calculate the communication cost based on a ratio of the group member(s) having left from the group communication, the cost per key update message, and the number of key update messages. Here, an average number of the key update messages may be calculated based on an expectation value of a number of sub trees including nodes left from a tree structure in which nodes in the same level have the same degree.

As described above, the communication cost may be calculated based on an operation between the cost per key update message and the number of key update messages. Here, the cost per key update message may be denoted as '$c_{cc}$'. In this case, '$c_{cc}$' may be determined according to characteristics of network communication lines. Also, the variation rate of the group member(s) having left from the group communication may be denoted as '$\lambda$'. Where a distribution of the group member(s) having left from the group communication corresponds to a Poisson distribution, the average number of the key update messages of '$E[E[m(\Upsilon, k)]]$' may be represented as $$E[E[m(\gamma, k)]] = \sum_{k=0}^{N} E[m(\gamma, k)] \cdot P_{poisson(\lambda T)}(k), \quad \text{[Equation 1]}$$

wherein, '$P_{poisson(\lambda T)}(k)$' may denote the Poisson distribution, and '$E[E[m(\Upsilon, k)]]$' may denote the expectation value. In this case, the expectation value representing the average number of the key update messages may be calculated as below.

For example, where group members leave from an arbitrary position, an average number of key update messages of the sub tree structure may be calculated as follows.

1. Calculate the expectation value of the number of sub trees of each level including the group members having left from the group communication.

2. Multiply the expectation value thereof by 'degree−1' of the corresponding level. This is because a key may be created by group members in a side of the sub tree structure.

3. Calculate a sum of the products of the expectation value and 'degree−1' of the corresponding level.

4. Deduct the number of group members from the sum thereof. This is because the key update messages may not need to be transmitted to the group members having left from the group communication, and the key update messages may not be required where all members of a single sub tree leave therefrom.

In this case, the expectation value of the number of sub trees including the group members having left from the group communication in a specific level may be represented as $$\sum_{k_i=b_i}^{B_i} Pr\left\{n\left(e, \prod_{j=i+1}^{h} a_j, \prod_{j=1}^{i} a_j\right) = k_i\right\} \cdot k_i \quad \text{[Equation 2]}$$

$$b_i = \lceil e/w_i \rceil$$
$$B_i = \min(e, v_i),$$

wherein 'bi' may denote a minimum number of sub trees from which nodes leave in an i-th level, and 'Bi' may denote a maximum number of sub trees from which nodes leave in the i-th level. As shown in the Equation 2, the expectation value may be obtained by multiplying the number of sub tress by a probability in the i-th level. In this case, the probability may be represented as $$Pr\{n(e, v, w) = l\} = \frac{C_l^v \cdot N(e, l, w)}{C_e^{vw}}, \quad \text{[Equation 3]}$$

wherein '$C_e^{vw}$' may denote the number of all cases where e number of nodes leave from v number of sub trees including w number of nodes, and '$C_l^v$' may denote the number of cases where nodes leave from l number of sub trees from among v number of sub trees. Also, 'N(e,l,w)' may denote the number of cases where at least one node leaves from l number of sub trees, that is, the number of cases where e number of nodes leave from l number of sub trees, from among the number of cases (overall cases) where e number of nodes leave from the entire sub trees. Accordingly, the Equation 3 may denote a probability where the number of sub trees including the group members having left from the group communication is 'l'.

In addition, where e number of nodes leave from v number of sub trees including w number of nodes, 'n(e,v,w)' may denote the number of cases including at least one of e number of the nodes having left. Also, where e number of nodes leave from l number of sub trees including w number of nodes, 'N(e,l,w)' may denote the number of cases where at least one node leaves from all of l number of sub trees. Here, 'N(e,l,w)' may be represented, based on concepts of inclusion and exclusion, as $$N(e, l, w) = \sum_{k=0}^{l-b} (-1)^k \cdot C_k^l \cdot C_e^{w(l-k)} (b \le l \le B) \quad \text{[Equation 4]}$$

$$b = \lceil e/w \rceil$$
$$B = \min(e, v),$$

wherein 'b' may denote a minimum number of sub trees from which nodes leave, and 'B' may denote a maximum number of sub trees from which nodes leave. Where e number of nodes leave from l number of sub tress including w number of nodes, the Equation 4 may denote the number of cases where at least one node leaves from all of l number of sub trees. In this case, where a set of cases where a node leaves from an i-th sub tree does not exist is assumed to be 'A_i', cases where a node leaves from each sub tree does not exist may be excluded from the overall cases in order to obtain the Equation 4, which may be calculated such as '$C^{\wedge}wl\_e-(A\_1\ A\_2\ \ldots\ A\_l)c$ (complementary cases)'. '$(A\_1\ A\_2\ \ldots\ A\_l)^c$' may be represented, based on concepts of inclusion and exclusion, as $$(n\{A_1\} \cup n\{A_2\} \cup \ldots \cup n\{A_l\}))^c = \bigcup n\{A_i\} - \quad \text{[Equation 5]}$$

$$\bigcup_{i \ne j}(n\{A_i\} \cup n\{A_j\}) + \bigcup_{\substack{i \ne j \\ i \ne k \\ j \ne k}}(n\{A_i\} \cap n\{A_j\} \cap n\{A_k\})$$

$$\ldots (n\{A_1\} \cap n\{A_2\} \cap \ldots \cap n\{A_l\}),$$

wherein $n\{A \cup B\} = n\{A\} + n\{B\} - n\{A \cap B\}$ may be a case where a number of sets is '2', and $C_1^l \cdot C_e^{w(l-1)}$, $C_2^l \cdot C_e^{w(l-2)} \ldots C_l^l \cdot C_e^{w(l-l)}$ may be given in a right side of the Equation 5. However, in a case of b=0, cases of b>0 may be required to be obtained only for '$(A\_1\ A\_2 \ldots A\_l-b)^c$', and thus the Equation 4 may be obtained.

In this case, the Equations 1 to 4 are integrated, which is represented as $$E[m(\Upsilon, k)] = \sum_{i=1}^{h-1}\sum_{k_i=b_i}^{B_i} Pr\left\{n\left(e, \prod_{j=i+1}^{h} a_j, \prod_{j=1}^{i} a_j\right) = k_i\right\} \cdot \quad \text{[Equation 6]}$$

$$k_i \cdot (a_i - 1) + (a_h - 1) - e,$$

wherein $$Pr\left\{n\left(e, \prod_{j=i+1}^{h} a_j, \prod_{j=1}^{i} a_j\right) = k_i\right\} \cdot k_i$$

may denote an expectation value of the number of sub trees including nodes having left from sub trees, and 'm($\Upsilon$, k)' may denote a number of key update messages where a number of nodes having left from sub trees is 'k=e' during a batch key update period, and a tree structure is '$\Upsilon$'. Also, '$\Upsilon$' may be expressed as '$\Upsilon$ ($a_1, a_2, a_3, \ldots, a_h$)', and '$a_i$' may denote a degree of nodes existing in an i-th level. Also, '$b_i$' and '$B_i$' may respectively denote a minimum value of sub trees from which nodes leave, and a maximum value thereof. Since overall tree, itself, is also calculated as a single tree from which nodes leave, '($a_h$–1)' may be added.

Throughout the specification, the term 'node' may denote a group member participating in group communication.

Where the expectation value of the number of sub trees including nodes having left from sub trees, that is, group members having left from group communication is calculated, communication cost depending on the batch key update may be represented, based on the Equations 1 to 6, as $$C_{cc}^{total}(\gamma, \lambda, T) = \quad \text{[Equation 7]}$$

$$c_{cc}\sum_{k=0}^{N}\left[\left\{\sum_{i=0}^{h-1}\sum_{k_i=b_i}^{B_i} Pr\left\{n\left(k, \prod_{j=i+1}^{h} a_j, \prod_{j=1}^{i} a_j\right) = k_i\right\} \cdot \right\} - \right.$$

$$k_i \cdot (a_i - 1) + (a_h - 1)$$

$$\left. k \right] \cdot \left(\frac{e^{-\lambda T} \cdot (\lambda T)^k}{k!}\right),$$

$$\left(\frac{e^{-\lambda T} \cdot (\lambda T)^k}{k!}\right)$$

may denote the Poisson distribution, and 'λ' may denote the variation rate of group members having left from group communication, which is calculated in the operation 210.

In operation S222, the key updating system calculates the security damage cost based on an exposed time during which the group communication is exposed to the group member(s) having left from the group communication. In this case, the key updating system may calculate the security damage cost based on a sum of a preceding key update time and the exposed time, and the exposed time may be determined based on a time when the group member(s) leaves from the group and a following key update time. For example, the security damage cost may be calculated based on three assumptions below.

A. Group members leave from group communication in a uniform distribution within a key update cycle.

B. Times at which the group members leave from the group communication is independent from each other.

C. Security damage cost is proportional to an exposed time during which the group communication is exposed to the group members having left from the group communication.

Where 'T1' is a preceding batch key update time and 'T2' is a batch key update time required to be determined, 'T' of the batch key update cycle (the above-mentioned key update cycle in the operation S220) may be obtained from 'T2−T1'. Also, where an arbitrary group member leaves from the group communication in a time of 't', the exposed time during which the group communication is exposed to the group member may be obtained from 'T2−t'. Since the group members leave from the group communication in the uniform distribution, security damage cost '$C_{sd}^{user_i}(T)$' created when a single group member leaves from the group communication may be represented as $$C_{sd}^{user_i}(T) = c_{sd}E[T] \quad \text{[Equation 8]}$$
$$= c_{sd}\int_{T_1}^{T_2}(T_2 - t)P_{sd}(t)\,dt$$
$$P_{sd}(t) = \frac{1}{T_2 - T_1},$$

wherein '$c_{sd}$' may denote a communication cost constant, that is, cost per unit time, and '$P_{sd}(t)$' may denote the uniform distribution. In this case, Equation 8 may be expressed as $$C_{sd}^{user_i}(T) = \frac{1}{2}c_{sd}T. \quad \text{[Equation 9]}$$

Total security damage cost created where it is assumed that the number of group members having left from the group communication vary depending on the Poisson distribution may be represented as $$C_{sd}^{total}(\lambda, T) = \sum_{user_i \in S_T(\lambda,T)} C_{sd}^{user_i}(T) \quad \text{[Equation 10]}$$

$$= n(S_T(\lambda, T)) \cdot C_{sd}^{user_i}(T)$$
$$= \frac{1}{2}c_{sd}\lambda T^2,$$

wherein '$C_{sd}^{total}(\lambda,T)$' may denote the total of security damage cost, and 'λ' may denote the variation rate of the group members having left from the group communication, which is calculated in the operation S210.

Also, the key updating system may calculate the security damage cost based on a preceding key update time and a maximum exposed time of the exposed times, which are different from the sum of the preceding key update time and the exposed time.

In operation S223, the key updating system gives a weight value to each of the communication cost and security damage cost. In operation S224, the key updating system calculates the key update cycle based on operations between the communication cost and security damage cost to which the respective weight values are given. Here, a total cost during a single key update cycle may be represented as $$C_{tc}(\Upsilon,\lambda,T) = w_{sd}C_{sd}^{total}(\lambda,T) + w_{cc}C_{cc}^{total}(\Upsilon,\lambda,T), \quad \text{[Equation 11]}$$

wherein '$C_{tc}(\Upsilon, \lambda, T)$' may denote the total cost during the single key update cycle, and '$W_{sd}$' may denote a weight value with respect to the security damage cost, and '$W_{cc}$' may denote a weight value with respect to the communication cost. Here, the weight values may be determined based on a policy considering the key updating system. Cost per unit time created due to key updating in the key updating system may be represented as $$\overline{C}_{tc}(\Upsilon, \lambda, T) = \frac{C_{tc}(\Upsilon, \lambda, T)}{T}, \quad \text{[Equation 12]}$$

wherein '$\overline{C}_{tc}(\Upsilon,\lambda,T)$' may denote the cost per unit time. Here, the key updating system may determine, as the key update cycle, 'T' providing a minimum value of the cost per unit time.

In operation S230, the key updating system performs key updating with respect to group members of the group communication based on the determined key update cycle. As described above, in the key updating method according to an exemplary embodiment, the key update cycle may be determined such that keys are updated based on a tradeoff between the communication cost and the security damage cost according to characteristics of services in an environment where keys are updated. Accordingly, generated cost may be minimized.

Figure 3:
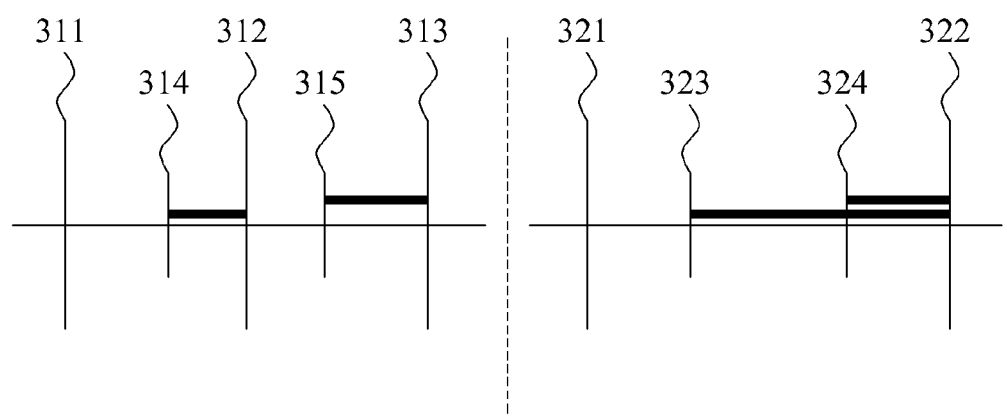
FIG. 3 is a diagram illustrating a comparative example of a relationship between a key update cycle and a security damage cost.

FIG. 3 illustrates a comparative example of a relationship between a key update cycle and a security damage cost. Where a group member leaves from the group communication, key updating may be performed to prevent the group communication from being exposed to the group member. However, where the key updating is performed every time a group member leaves therefrom, communication cost may accordingly increase in response to the key updating.

As illustrated in FIG. 3, a key updating may performed in accordance with a certain interval, that is, a key updating cycle, thereby reducing the communication cost. Since the key updating is not performed right after the group member leaves the group communication, the group member that left the group communication may access the communication of the existing group members until the key updating for the group communication is performed. In this case, security problems may be created due to exposure of the group communication to the group member that left the group communication. Accordingly, in order to reduce the security problems, the key updating may be performed frequently as illustrated in the left side of FIG. 3. However, this increases the communication cost. Conversely, where the key updating is less frequently performed as illustrated in the right side of FIG. 3, the communication cost may be reduced, but the security problems may increase. For example, where the key updating is respectively performed in a first time 311, a second time 312, and a third time 313 as illustrated in the left side of FIG. 3, an exposed time during which the group communication is exposed to group members that leave in a fourth time 314 and a fifth time 315 may be insignificant. However, the communication cost created due to key updating three times may increase. Where the key updating is respectively performed in a sixth time 321 and a seventh time 322 during the same time interval as illustrated in the right side of FIG. 3, the communication cost may be relatively reduced in comparison with those in the left side of FIG. 3. However, an exposed time during which the group communication is exposed to group members having left in an eighth time 323 and a ninth time 324 may increase, thereby increasing the security damage cost.

Figure 4:
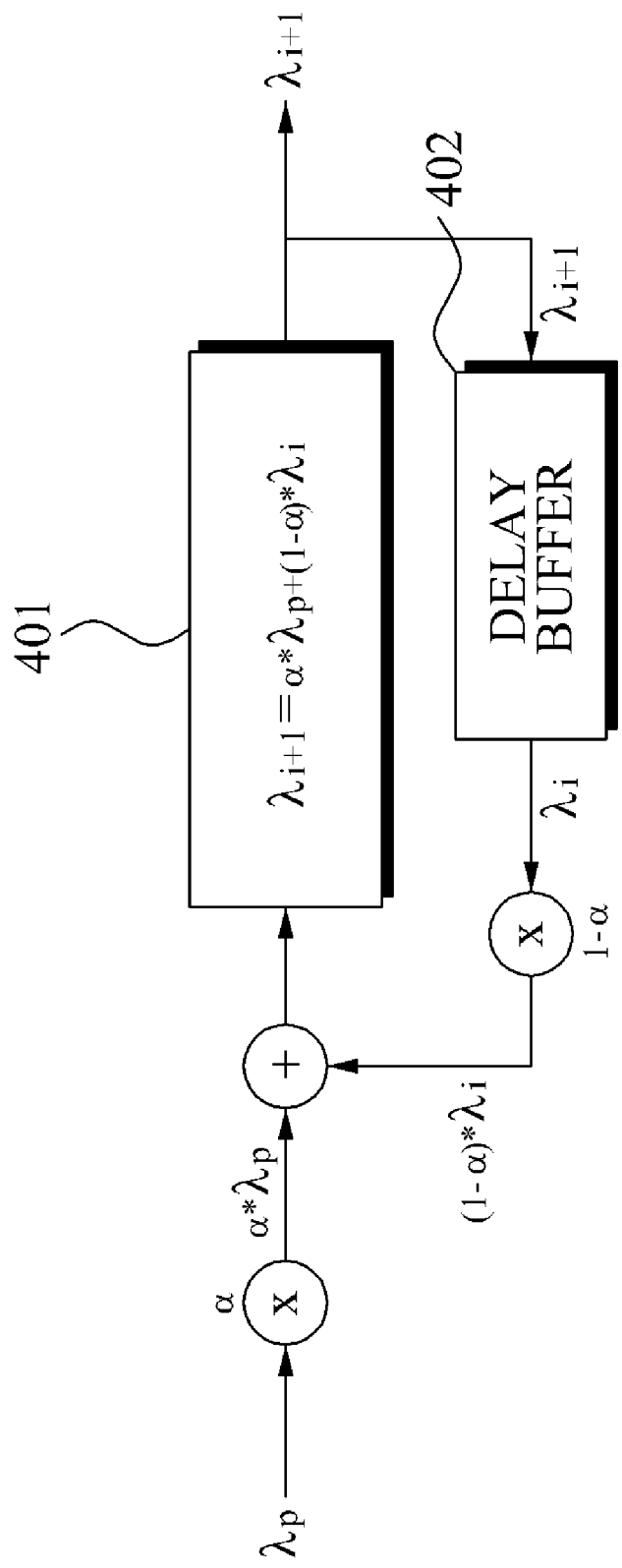
FIG. 4 is a diagram for illustrating an exemplary method for measuring a variation rate of group members having left from group communication.

FIG. 4 illustrates an exemplary method for measuring a variation rate of group members having left from group communication. '$\lambda_p$' illustrated in FIG. 4 is a variation rate of group members having left from the group communication, which is currently measured in real time. '$\lambda_i$' may denote the variation rate, that is, a departure rate of group members having left in an i-th key update cycle. '$\lambda_{i+1}$' may be a variation rate used for determining a following key update cycle, which may be calculated as illustrated in a calculation operation 401. '$\alpha$' may be an adjustable variable that is determined by the key updating system, and specifically, a variable enabling the key updating system to give more weight value to a variation rate from among a variation rate of group members currently leaving and a variation rate of group members having already left. Specifically, '$\alpha$' may be a variable to cope with a variation rate that is rapidly changed, and may be used to adjust cost created at the time of key updating which may be rapidly distorted where group members are rapidly leaving in a short time. A delay buffer 402 may be used to store a variation rate of group members that have previously left for the following key update cycle.

Figure 5:
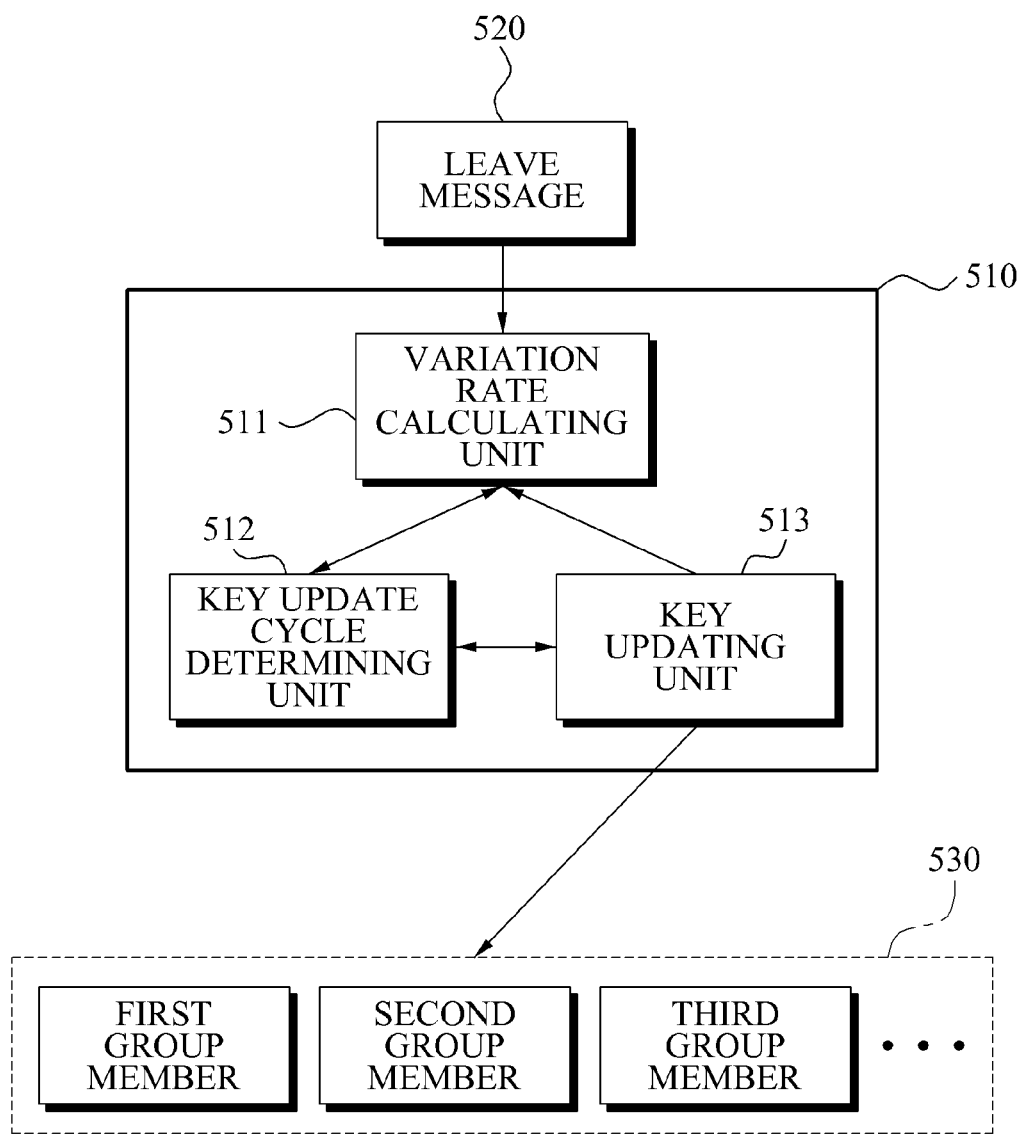
FIG. 5 is a block diagram illustrating an internal configuration of a key updating system according to an exemplary embodiment.

FIG. 5 illustrates an internal configuration of a key updating system 510 according to an exemplary embodiment. The key updating system 510 comprises a variation rate calculating unit 511, a key update cycle determining unit 512, and a key updating unit 513.

The variation rate calculating unit 511 calculates a variation rate of a group member having left from group communication based on a leave message 520 received from the group member. Here, the variation rate of the group member having left may be used to calculate the communication cost and security damage cost. An exemplary method for measuring the variation rate has been described above with, for example, reference to FIG. 4.

The key update cycle determining unit 512 determines a key update cycle based on the communication cost and the security damage cost. The communication cost and security damage cost may vary depending on the key update cycle, and changes in the communication cost and security damage cost depending on the key update cycle have been described with reference to FIG. 3. The key update cycle determining unit 512 will be further described with reference to FIG. 6.

The key updating unit 513 performs key updating with respect to group members 530 of the group communication based on the determined key update cycle. As described above, in the key updating system according to an exemplary embodiment, the key update cycle may be determined such that keys are updated based on a tradeoff between the communication cost and the security damage cost according to characteristics of services in an environment where keys are updated. Accordingly, generated cost may be minimized.

Figure 6:
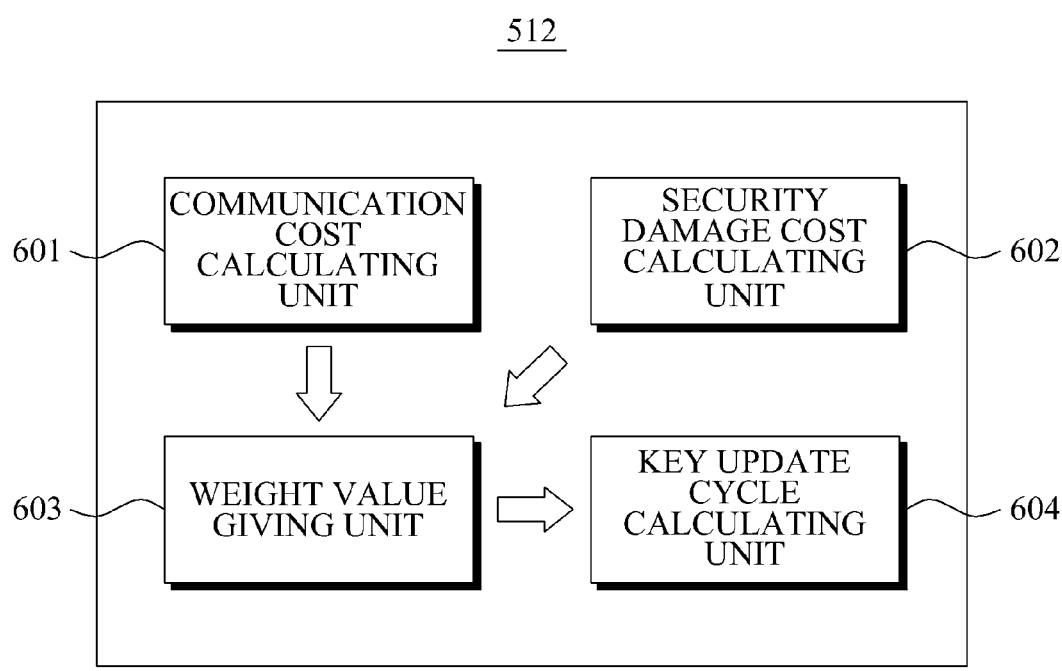
FIG. 6 is a block diagram illustrating an internal configuration of a key update cycle determining unit according to an exemplary embodiment.

FIG. 6 illustrates an internal configuration of the key update cycle determining unit 512 of FIG. 5 according to an exemplary embodiment. The key update cycle determining unit 512 comprises a communication cost calculating unit 601, a security damage cost calculating unit, a weight value giving unit 603, and a key update cycle calculating unit 604.

The communication cost calculating unit 601 calculates the communication cost based on cost per key update message, and the number of key update messages. For example, the communication cost calculating unit 601 may calculate the communication cost based on a ratio of the group member having left from the group communication, the cost per key update message, and the number of key update messages. Here, an average number of key update messages is calculated based on an expectation value of a number of sub trees including nodes having left from a tree structure in which nodes in the same level have the same degree.

As described above, the communication cost may be calculated through an operation between the cost per key update message and the number of key update messages. Here, the cost per key update message may be denoted as '$c_{cc}$'. In this case, '$c_{cc}$' may be determined according to characteristics of network communication lines. Also, the variation rate of the group member having left from the group communication may be denoted as '$\lambda$'. Where a distribution of the group member having left from the group communication corresponds to a Poisson distribution, the average number of the key update messages of '$E[E[m(\Upsilon, k)]]$' may be represented as $$E[E[m(\gamma, k)]] = \sum_{k=0}^{N} E[m(\gamma, k)] \cdot P_{poisson(\lambda T)}(k), \quad \text{[Equation 13]}$$

wherein, '$P_{poisson(\lambda T)}(k)$' may denote the Poisson distribution, and '$E[E[m(\Upsilon, k)]]$' may denote the expectation value. In this case, the expectation value representing the average number of the key update messages may be calculated as follows.

For example, where group members leave from an arbitrary position, an average number of key update messages of the sub tree structure may be calculated as follows.

1. Calculate the expectation value of the number of sub trees of each level including the group members having left from the group communication.

2. Multiply the expectation value thereof by 'degree−1' of the corresponding level. This is because a key may be created by group members in a side of the sub tree structure.

3. Calculate a sum of the products of the expectation value and 'degree−1' of the corresponding level.

4. Deduct the number of group members from the sum thereof. This is because the key update messages may not need to be transmitted to the group member having left from the group communication, and the key update messages may not be required where all members of a single sub tree leave therefrom.

In this case, the expectation value of the number of sub trees including the group members having left from the group communication may be represented as $$Pr\{n(e, v, w) = l\} = \frac{C_l^v \cdot N(e, l, w)}{C_e^{vw}}. \quad \text{[Equation 14]}$$

Here, where e number of nodes leave from v number of sub trees including w number of nodes, 'n(e,v,w)' may denote the number of sub trees including at least one of e number of the left nodes. Also, where e number of nodes leave from l number of sub trees including w number of nodes, 'N(e,l,w)' may denote the number of cases where at least one node leaves from all of l number of sub trees. Here, 'N(e,l,w)' may be represented, based on concepts of inclusion and exclusion, as $$N(e, l, w) = \sum_{k=0}^{l-b} (-1)^k \cdot C_k^l \cdot C_e^{w(l-k)} (b \le l \le B) \quad \text{[Equation 15]}$$

$$b = \lceil e/w \rceil$$

$$B = \min(e, v),$$

wherein 'b' may denote a minimum number of sub trees from which nodes leave, and 'B' may denote a maximum number of sub trees from which nodes leave.

In this case, the Equations 13 to 15 are integrated, which is represented as $$E[m(\Upsilon, k)] = \quad \text{[Equation 16]}$$

$$\sum_{i=1}^{h-1} \sum_{k_i=b_i}^{B_i} Pr\left\{n\left(e, \prod_{j=i+1}^{h} a_j, \prod_{j=1}^{i} a_j\right) = k_i\right\} \cdot k_i \cdot (a_i - 1) +$$

$$(a_h - 1) - e,$$

wherein $$Pr\left\{n\left(e, \prod_{j=i+1}^{h} a_j, \prod_{j=1}^{i} a_j\right) = k_i\right\} \cdot k_i$$

may denote an expectation value of the number of sub trees including nodes left from sub trees, and 'm(Υ, k)' may denote a number of key update messages where a number of nodes left from sub trees is 'k=e' during a batch key update period, and a tree structure is 'Υ'. Also, 'Υ' may be expressed as 'Υ (a₁, a₂, a₃, . . . , aₕ)', and 'aᵢ' may denote a degree of nodes existing in an i-th level. Also, 'bᵢ' and 'Bᵢ' may respectively denote a minimum value of sub trees from which nodes leave, and a maximum value thereof. Since overall tree, itself, is also calculated as a single tree from which nodes leave, '(aₕ-1)' may be added.

Throughout the specification, the term 'node' may denote a group member participating in group communication.

Where the expectation value of the number of sub trees including nodes left from sub trees, that is, group members having left from group communication is calculated, communication costs depending on the batch key update may be represented, based on the Equations 13 to 16, as $$C_{cc}^{total}(\gamma, \lambda, T) = \quad \text{[Equation 17]}$$

$$c_{cc} \sum_{k=0}^{N} \left[ \left\{ \sum_{i=0}^{h-1} \sum_{k_i=b_i}^{B_i} Pr\left\{ n \left( e, \prod_{j=i+1}^{h} a_j, \prod_{j=1}^{i} a_j \right) = k_i \right\} \cdot \right\} - k \right] \cdot k_i \cdot (a_i - 1) + (a_h - 1)$$

$$\left( \frac{e^{-\lambda T} \cdot (\lambda T)^k}{k!} \right),$$

wherein $$\left( \frac{e^{-\lambda T} \cdot (\lambda T)^k}{k!} \right)$$

may denote the Poisson distribution, and 'λ' may denote the variation rate of group members having left from group communication, which is calculated in the operation 210.

The security damage cost calculating unit 602 calculates the security damage cost based on an exposed time during which the group communication is exposed to the group member having left from the group communication. In this case, the security damage cost calculating unit 602 may calculate the security damage cost based on a sum of a preceding key update time and the exposed time, and the exposed time may be determined based on a time when the group member leaves from the group and a following key update time. For example, the security damage cost may be calculated based on three assumptions described below.

A. Group members leave from group communication in a uniform distribution within a key update cycle.

B. Times at which the group members leave from the group communication is independent from each other.

C. Security damage cost is proportional to an exposed time during which the group communication is exposed to the group members having left from the group communication.

Where 'T1' is a preceding batch key update time and 'T2' is a batch key update time required to be determined, 'T' of the batch key update cycle (the above-mentioned key update cycle in the operation S220) may be obtained from 'T2−T1'. Also, where an arbitrary group member leaves from the group communication in a time of 't', the exposed time during which the group communication is exposed to the group member may be obtained from 'T2−t'. Since the group members leave from the group communication in the uniform distribution, security damage cost '$C_{sd}^{user_i}(T)$' created where a single group member leaves from the group communication may be represented as $$C_{sd}^{user_i}(T) = c_{sd} E[T] \quad \text{[Equation 18]}$$

$$= c_{sd} \int_{T_1}^{T_2} (T_2 - t) P_{sd}(t) dt$$

$$P_{sd}(t) = \frac{1}{T_2 - T_1},$$

wherein '$c_{sd}$' may denote a communication cost constant, that is, cost per unit time, and '$P_{sd}(t)$' may denote the uniform distribution. In this case, Equation 8 may be expressed as $$C_{sd}^{user_i}(T) = \frac{1}{2} c_{sd} T. \quad \text{[Equation 19]}$$

Total of security damage cost created where it is assumed that the number of group members having left from the group communication vary depending on the Poisson distribution may be represented as $$C_{sd}^{total}(\lambda, T) = \sum_{user_i \in S_T(\lambda,T)} C_{sd}^{user_i}(T) \quad \text{[Equation 20]}$$
$$= n(S_T(\lambda, T)) \cdot C_{sd}^{user_i}(T)$$
$$= \frac{1}{2} c_{sd} \lambda T^2,$$

wherein '$C_{sd}^{total}(\lambda,T)$' may denote the total of security damage cost, and '$\lambda$' may denote the variation rate of the group members having left from the group communication, which is calculated in the operation S210.

Also, the security damage cost calculating unit 602 may calculate the security damage cost based on a preceding key update time and a maximum exposed time of the exposed times, which are different from the sum of the preceding key update time and the exposed time The weight value giving unit 603 may give a weight value to each of the communication cost and security damage cost, and the key update cycle calculating unit 604 may calculate the key update cycle based on an operation between the communication cost and security damage cost to which the respective weight values are given. Here, a total cost during a single key update cycle may be represented as $$C_{tc}(\Upsilon,\lambda,T) = w_{sd} C_{sd}^{total}(\lambda,T) + w_{cc} C_{cc}^{total}(\Upsilon,\lambda,T), \quad \text{[Equation 21]}$$

wherein '$C_{tc}(\Upsilon, \lambda, T)$' may denote the total cost during the single key update cycle, and '$W_{sd}$' may denote a weight value with respect to the security damage cost, and '$W_{cc}$' may denote a weight value with respect to the communication cost. In this case, the weight values may be determined based on a policy considering the key updating system. Cost per unit time created due to key updating in the key updating system may be represented as $$\overline{C}_{tc}(\Upsilon, \lambda, T) = \frac{C_{tc}(\Upsilon, \lambda, T)}{T}, \quad \text{[Equation 22]}$$

wherein '$\overline{C}_{tc}(\Upsilon,\lambda,T)$' may denote the cost per unit time. In this case, the key updating cycle determining unit 512 may determine, as the key update cycle, 'T' having a minimum value of the cost per unit time.

Figure 7:
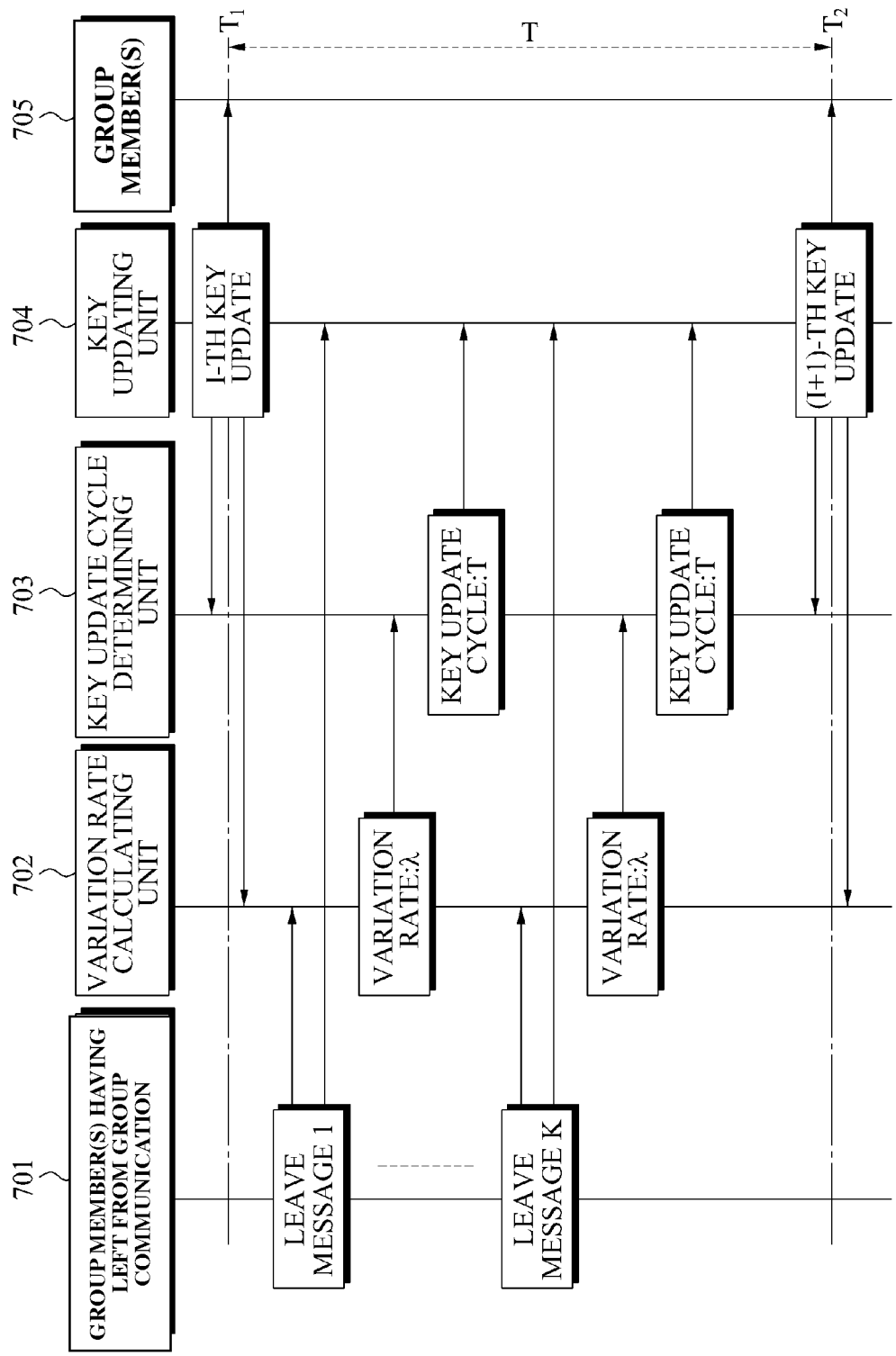
FIG. 7 is a diagram illustrating a key updating procedure using a key update cycle according to an exemplary embodiment.

FIG. 7 illustrates a key updating procedure using a key update cycle according to an exemplary embodiment. FIG. 7 shows a group member(s) 701 having left from group communication, a variation rate calculating unit 702, a key update cycle determining unit 703, a key updating unit 704, and information transmitted between a group member(s) 705 to which key updating is applied are illustrated. For example, information about an updated key after the key updating unit 704 updates a preceding key may be transmitted to the variation rate calculating unit 720 and the key update cycle determining unit 703. Accordingly, the variation rate calculating unit 720 and the key update cycle determining unit 703 may newly calculate the following key update cycle.

Where the group member(s) 701 transmit a leave message(s) to a key updating system, the leave message(s) are transmitted to the variation rate calculating unit 702 and key update cycle determining unit 703 of the key update system. The variation rate calculating unit 702 may calculate the variation rate using the leave message(s), and transmit the variation rate to the key update cycle determining unit 703. The key updating unit 704 may confirm which group member(s) leave from a key tree through the leave message(s), and transmit a required key to a group member(s) requiring key updating at the time of key updating.

The key update cycle determining unit 703 may receive the variation rate from the variation rate calculating unit 702 to calculate the key update cycle, and transmit the calculated key update cycle to the key updating unit 704. For example, the key updating unit 704 may receive 'T', that is, the key update cycle from the key update cycle determining unit 703. In this case, where a current time exceeds a time 'T2' obtained by summing up the preceding key update time 'T1' and the key update cycle 'T', a new key is updated at the time 'T2' and the updated key is transmitted to the group member(s) 705.

For example, the key updating unit 704 performs key updating where 'T1+T<=current time'. At the same time, the key updating unit 704 may inform the variation rate calculating unit 702 and the key update cycle determining unit 703 of information about the key updating, and thus a new key update cycle may be determined.

Figure 8:
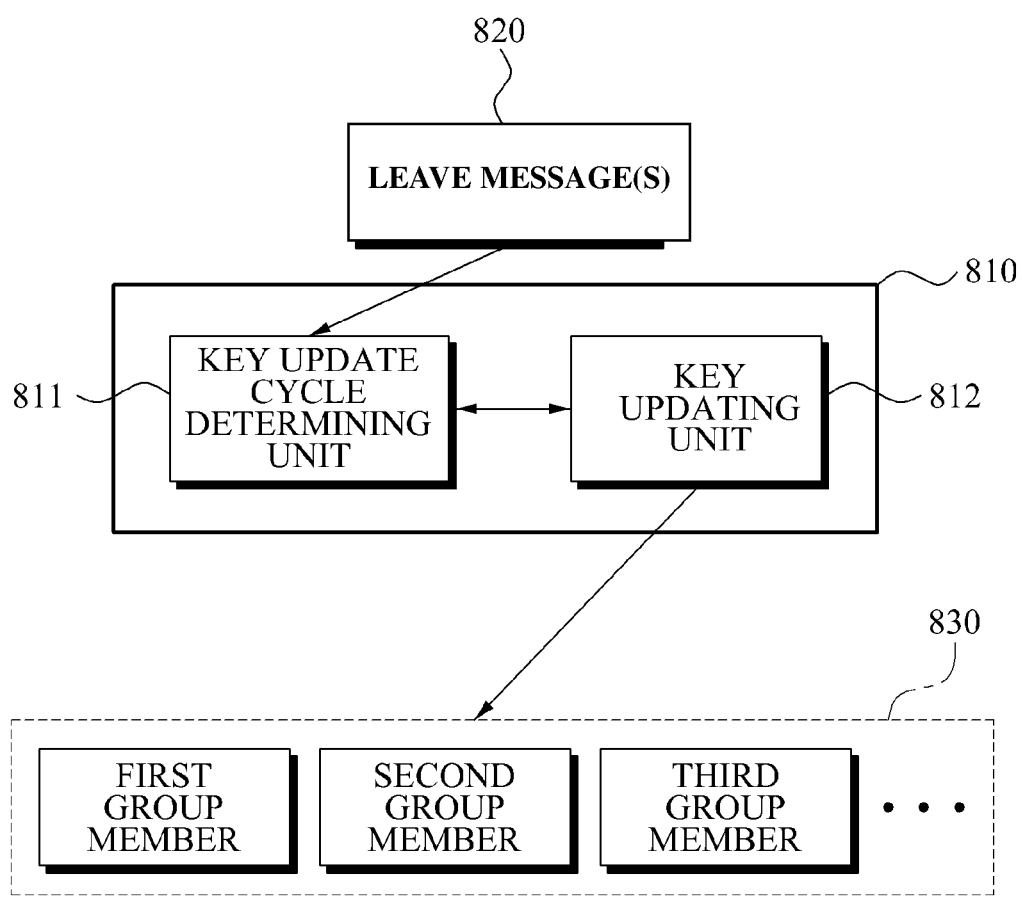
FIG. 8 is a block diagram illustrating an internal configuration of a key updating system according to another exemplary embodiment.

FIG. 8 illustrates an internal configuration of a key updating system 810 according to another exemplary embodiment. The key update system 810 comprises a key update cycle determining unit 811 and a key updating unit 812. For example, the key update cycle determining unit 811 may directly receive leave messages 820 from group members having left from group communication, and may determine a key update cycle through the leave messages 820. The key updating unit 812 may update keys of group members 830 through the key update cycle. An exemplary method for determining the key update cycle has been already described above and thus will be omitted.

According to certain key update system and key update method described above, a key update cycle may be determined such that keys are updated based on a tradeoff between the communication cost and the security damage cost according to characteristics of services in an environment where keys are updated. Accordingly, generated cost may be minimized.

Also, terminals and enterprises providing services may determine the key update cycle depending on the priority of the unit communication cost and security damage cost, and the frequency of adding/leaving of the group member(s) may be also considered at the time of determining the key update cycle. For example, the key update cycle may be determined in order to minimize the generated cost. In addition, the group communication may be managed in both a network key server and/or a mobile terminal, and accordingly, the key update system and key update method according to exemplary embodiments may be applicable to wired/wireless equipment.

The methods described above including a key updating method may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A key updating system for group communication between a plurality of group members, the key updating system comprising:
   a key update cycle determining unit comprising:
      a communication cost calculating unit configured to calculate a communication cost based on a Poisson distribution using a variation rate of group members having left from the group communication, the cost per key update message, and the number of key update messages; and
      a security damage cost calculating unit configured to calculate the security damage cost based on an exposed time during which the group communication is exposed to a group member having left from the group communication; and
   a key updating unit configured to perform a key updating with respect to one or more group members of the group communication based on the determined key update cycle, wherein the key update cycle determining unit and the key updating unit are implemented by hardware.

2. The key updating system of claim 1, wherein the number of key update messages corresponds with an average number of the key update messages, the average number of the key update messages being calculated based on an expectation value of a number of sub trees including group members having left from a tree structure in which group members in the same level have the same degree.

3. The key updating system of claim 1, wherein the security damage cost calculating unit calculates the security damage cost based on a preceding key update time and a maximum exposed time of exposed times, and the exposed time is determined based on a time when the group member leaves from the group communication and the following key update time.

4. The key updating system of claim 1, wherein the security damage cost calculating unit calculates the security damage cost based on difference between a preceding key update time and the following key update time, and the exposed time, and the exposed time is determined based on a time when the group member leaves from the group communication and the following key update time.

5. The key updating system of claim 1, wherein the key update cycle determining unit further comprises:
   a weight value giving unit configured to give a weight value to each of the communication cost and the security damage cost; and
   a key update cycle calculating unit configured to calculate the key update cycle based on an operation between the communication cost and security damage cost to which the respective weight values are given, wherein the weight value giving unit and the key update cycle calculating unit are implemented by hardware.

6. The key updating system of claim 1, wherein the key update cycle determining unit comprises:
   a leave message receiving unit configured to receive a leave message from a group member having left from the group communication; and
   a key update cycle calculating unit configured to calculate the communication cost and the security damage cost based on the number of received leave messages to thereby calculate the key update cycle, wherein the leave message receiving unit and the key update cycle calculating unit are implemented by hardware.

7. The key updating system of claim 1, further comprising:
   a variation rate calculating unit configured to calculate a variation rate of group members having left from the group communication based on a leave message received from the group member, wherein the variation rate calculating unit is implemented by hardware.

8. The key updating system of claim 7, wherein the key update cycle determining unit calculates the security damage cost based on the variation rate and a communication cost constant to thereby determine the key update cycle and the communication cost constant is a cost per unit time.

9. The key updating system of claim 1, wherein the key updating unit transmits, to the key update cycle determining unit, information about a time during which the key updating is performed, and the key update cycle determining unit determines a preceding key update cycle according to the time during which the key updating is performed.

10. The key updating system of claim 1, wherein the exposed time is determined based the following key update time subtracted from a time when the group member leaves from the group communication.

11. A key updating method for use in group communication between a plurality of group members, the key updating method comprising:
   determining a key update cycle based on:
      a communication cost determined based on a Poisson distribution using a variation rate of group members having left from the group communication, the cost per key update message, and the number of key update messages, and
      a security damage cost determined based on an exposed time during which the group communication is exposed to a group member having left from the group communication; and
   performing a key updating with respect to one or more group members of the group communication based on the determined key update cycle, wherein the determining operation, the performing operation, or any combination thereof is performed by hardware.

12. The key updating method of claim 11, wherein the determining of the key update cycle further comprises:

giving a weight value to each of the communication cost and the security damage cost; and calculating the key update cycle based on an operation between the communication cost and security damage cost to which the respective weight values are given.

13. The key updating method of claim 11, wherein the determining of the key update cycle comprises:

receiving a leave message from a group member having left from the group communication; and calculating the communication cost and security damage cost based on the number of received leave messages to thereby calculate the key update cycle.

14. The key updating method of claim 11, further comprising:

calculating a variation rate of a group member having left from the group communication based on a leave message received from the group member, wherein determining of the key update cycle comprises calculating the communication cost and the security damage cost based on the variation rate to thereby determine the key update cycle.

15. A non-transitory computer-readable storage medium storing a program to update a key in group communication between a plurality of group members, comprising instructions to cause a computer to:

determine a key update cycle based on:

a communication cost determined based on a Poisson distribution using a variation rate of group members having left from the group communication, the cost per key update message, and the number of key update messages; and a security damage cost determined based on an exposed time during which the group communication is exposed to a group member having left from the group communication; and perform a key updating with respect to one or more group members of the group communication based on the determined key update cycle.

* * * * *